A. S. EBERMAN & E. HARLAN.
NAME PLATE.
APPLICATION FILED SEPT. 15, 1910.

999,438.

Patented Aug. 1, 1911.

WITNESSES:

INVENTOR
Albert S. Eberman
Enoch Harlan

BY

Attorney

UNITED STATES PATENT OFFICE.

ALBERT SYLVANUS EBERMAN AND ENOCH HARLAN, OF BALTIMORE, MARYLAND.

NAME-PLATE.

999,438.     Specification of Letters Patent.     Patented Aug. 1, 1911.

Application filed September 15, 1910. Serial No. 582,184.

*To all whom it may concern:*

Be it known that we, ALBERT S. EBERMAN and ENOCH HARLAN, citizens of the United States, residing at Baltimore, in the State of Maryland, have invented certain new and useful Improvements in Name-Plates; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in methods of making name plates designed especially for use in printing duplicate letters and consists essentially in the cutting off of the impression end of the type together with a portion of the linotype slug and placing the same upon the surface of a metallic plate which has been previously coated with solder or other adhesive material, after which subjecting the plate to heat to cause the solder or other material to fuse and, when set, securely hold the impression end of the slug to the plate, the latter afterward being backed up or planed off to any desired thickness of material.

The invention consists further of various details of construction and arrangements of parts all as will be hereinafter fully described and then specifically defined in the appended claim.

Our invention is illustrated in the accompanying drawings, in which:—

Figure 1:
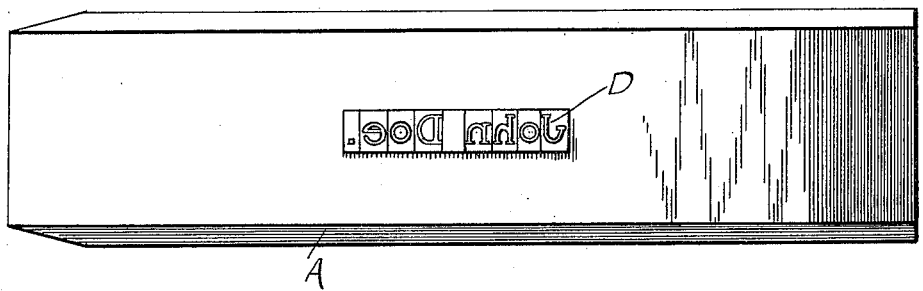
Figure 2:
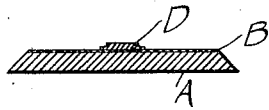
Figure 3:
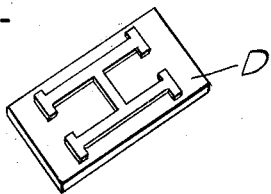

Figure 1 is a plan view of a name plate made in accordance with our invention. Fig. 2 is a sectional view transversely through the plate with the impression end of the type with a portion of the slug soldered or otherwise secured thereto, and Fig. 3 is an enlarged detail view of a type cut in readiness to be applied to the plate.

Reference now being had to the details of the drawings by letter, A designates a metallic plate made of iron or any other suitable material and having a proper bevel and thickness. The narrow face of the plate is preferably coated with a solder, designated by letter B, which will melt at about 250° Fahrenheit and formed of any desired length. The impression end of the linotype slug, one of which is designated by letter D, is sawed off with a portion of the slug integral therewith and the impression end thus severed is placed upon the coating of solder or other adhesive material and the plate subjected to sufficient degree of heat to cause the solder to melt and the slug to be soldered to the plate, thereby making the type and plate integral. The short shank portion of the slug, when adjusted in place and fastened to the plate, will serve to prevent any lateral movement of the impression surface. The plate, when thus formed, may be fastened to any suitable backing and, when it is desired to remove the impression end of the type or slug from the plate, it may be done by heating up the plate to a sufficient degree of temperature to allow the solder to fuse, the plate being cleared for use again in the same manner.

While we have referred to our invention as especially adapted for name plates, it will be understood that we do not confine ourselves to such use but it may be utilized for printing of any kind.

What we claim to be new is:—

A method of making name plates consisting of coating a thin sheet of metal with a solder to melt at a lower degree of temperature than linotype metal, applying to the coated surface of the solder the short shank portion of a linotype slug having an integral impression end, afterward subjecting the plate to sufficient heat to fuse the solder and cause the impression end of the slug to be held rigidly to the plate, the short shank portion of the slug serving to prevent any lateral movement of the impression surface.

In testimony whereof we hereunto affix our signatures in the presence of two witnesses.

ALBERT SYLVANUS EBERMAN.
        ENOCH HARLAN.

Witnesses:
   ROBERT E. GETTIER,
   GEO. McGAW BENSON.

---

Copies of this patent may be obtained for five cents each, by addressing the "Commissioner of Patents, Washington, D. C."